US012699017B2

(12) United States Patent
Gneuss et al.

(10) Patent No.: US 12,699,017 B2
(45) Date of Patent: Aug. 4, 2026

(54) PRESSURE SENSOR ASSEMBLY WITH A REMOTELY PARAMETERISABLE, ELECTRICAL THRESHOLD DEVICE

(71) Applicant: Gneuss GmbH, Bad Oeynhausen (DE)

(72) Inventors: Daniel Gneuss, Charlotte, NC (US); Stephan Gneuss, Bad Oeynhausen (DE); Detlef Gneuss, Carabietta (CH)

(73) Assignee: Gneuss GmbH, Bad Oeynhausen (DE)

( * ) Notice: Subject to any disclaimer, the term of this patent is extended or adjusted under 35 U.S.C. 154(b) by 299 days.

(21) Appl. No.: 18/618,676

(22) Filed: Mar. 27, 2024

(65) Prior Publication Data

US 2024/0241006 A1 Jul. 18, 2024

Related U.S. Application Data

(63) Continuation of application No. PCT/DE2022/100717, filed on Sep. 27, 2022.

(30) Foreign Application Priority Data

Sep. 29, 2021 (DE) ..................... 10 2021 125 293.8

(51) Int. Cl.
*G01L 19/00* (2006.01)
*G01L 9/00* (2006.01)

(52) U.S. Cl.
CPC ........ *G01L 19/0061* (2013.01); *G01L 9/0041* (2013.01); *G01L 19/0007* (2013.01)

(58) Field of Classification Search
CPC ............. G01L 19/0007; G01L 19/0041; G01L 19/0061; G01L 19/086; G01L 27/002
See application file for complete search history.

(56) References Cited

U.S. PATENT DOCUMENTS 7,336,068 B2 2/2008 Mueller et al.
8,745,692 B2 6/2014 Grittke et al.
(Continued)

FOREIGN PATENT DOCUMENTS

DE 10144971 A1 3/2003
DE 10162334 A1 7/2003
(Continued)

OTHER PUBLICATIONS

International Search Report dated Feb. 15, 2023 in corresponding application PCT/DE2022/100717.

*Primary Examiner* — John Fitzgerald
(74) *Attorney, Agent, or Firm* — Muncy, Geissler, Olds & Lowe, P.C.

(57) ABSTRACT

A pressure sensor assembly having a remotely parameterisable, electrical threshold device is provided. A transmission unit is connected at least to a sensor element and a data bus line leading to an external connection. A monitoring unit contains the threshold device and is connected to the sensor element and an actuator for generating an output signal. A closed housing has at least the transmission unit and the overload protection unit arranged therein. The transmission unit is connected to the monitoring unit via at least one internal data bus line, which is interrupted at an electrically switchable bridge switch element. At least one parameterisation module connected to the threshold device is provided in the monitoring unit for adjusting a lower and/or an upper pressure threshold value. The parameterisation module can be connected to the transmission unit via the internal data bus line by closing the bridge switch element.

13 Claims, 2 Drawing Sheets

(56)          References Cited

U.S. PATENT DOCUMENTS

| | | | |
|---|---|---|---|
| 9,141,106 B2 | 9/2015 | De Groot et al. | |
| 9,640,344 B2 * | 5/2017 | McFarland ........ | H01H 35/2607 |
| 10,466,127 B2 * | 11/2019 | Sgourakes .......... | G01L 19/0046 |
| 10,871,416 B2 | 12/2020 | Yokota et al. | |
| 10,969,805 B2 * | 4/2021 | Lange .................. | G01K 13/026 |
| 11,156,523 B2 * | 10/2021 | Jilderos ................... | G01L 19/04 |
| 11,209,332 B2 * | 12/2021 | Zhao ..................... | G01L 19/086 |
| 2013/0031984 A1 * | 2/2013 | Jones ................. | G01L 19/0084 |
| | | | 73/717 |

FOREIGN PATENT DOCUMENTS

| | | | |
|---|---|---|---|
| DE | 102008010864 A1 | 8/2009 |
| DE | 102008051372 A1 | 2/2010 |
| DE | 102012112687 A1 | 6/2014 |
| DE | 102016120306 A1 | 4/2018 |
| EP | 3396347 A1 | 10/2018 |

* cited by examiner

PRESSURE SENSOR ASSEMBLY WITH A REMOTELY PARAMETERISABLE, ELECTRICAL THRESHOLD DEVICE

This nonprovisional application is a continuation of International Application No. PCT/DE2022/100717, which was filed on Sep. 27, 2022, and which claims priority to German Patent Application No. 10 2021 125 293.8, which was filed in Germany on Sep. 29, 2021, and which are both herein incorporated by reference.

BACKGROUND OF THE INVENTION

Field of the Invention

The invention relates to a pressure sensor assembly with a remotely parameterizable electrical threshold device.

Description of the Background Art

For various technical applications, it is necessary to monitor pressurized systems with regard to the prevailing pressure, so that when a limit value is reached, all pressure-generating elements can be switched off via a control system and/or the excess pressure can be reduced in a targeted manner.

This applies in particular to plastic extrusion lines, in which, in addition to high pressures in the processed plastic melt, high temperatures regularly occur. The standard DIN EN 1114-1:2012-01, which is relevant for plastic extruders, stipulates in the safety requirements and protective measures that the extruder and other parts under excess pressure must be protected against exceeding the maximum permissible internal pressure specified by the machine manufacturer, wherein one of the measures considered permissible is the provision of a pressure transducer system in accordance with EN ISO 13849-1:2008, PL=c, that when a limit value is reached, all pressure-generating elements are switched off via the control system. The latter standard, EN 13849-1: 2008, refers to design principles for safety-related parts of control systems and shows the relationship between the required Performance Level (PL) and Safety Integrity Level (SIL). In this context, there is a requirement that limit values are stored in the overload protection device that are unchangeable during system operation.

However, the limit values to be provided in the case of plastic extrusion lines are not only system-specific, but may also depend on the material being processed, i.e., process-related. As a result, the processor must select suitable sensors, each with different threshold values, from a group of different sensors and install them as required. This entails high costs for the multiple procurement of sensors and the modifications to the system.

A pressure sensor assembly with a remotely parametrizable electrical threshold device is desirable: the pressure sensor assembly could be accessed via a data connection, so that the relevant limit values can be reset by means of software. The advantage of this would be that it can be easily adapted to the system in which it is installed and the process carried out in it. However, if the remotely controlled parameterization is unsecured, it could not be ruled out that the threshold device could be accessed during ongoing operation via the software level and that the limit values could be changed during the operation of the system, wherein incorrect limit values could possibly be stored. Therefore, the firmware and in particular external control software must be included in the safety assessment.

SUMMARY OF THE INVENTION

It is therefore an object of the invention to further develop a pressure sensor assembly with a remotely parametrizable electrical threshold device of the type mentioned above, in such a way that a rule-compliant, tamper-proof monitoring of technical systems, in particular pressure monitoring in plastic extrusion lines, is possible.

The invention is based on the fact that, although the switching thresholds in the pressure sensor assembly can be changed by remote operation via an external data line, so that convenient adaptation to the respective process is possible, this requires the physical presence of an operator in the vicinity of the sensor array. The user must open a hardware lock of the internal data bus line between the electronic assemblies so that remote access is possible via the external data bus line.

This provides a solution that does not require a safety assessment for software outside the pressure sensor assembly, e.g., a machine control system. With the invention, changes can be made by means of an externally controlling software without having to carry out another new, time-consuming safety assessment.

The invention provides for the separation of the transmission unit from the monitoring unit in such a way that no data exchange between them is possible during operation and thus the monitoring unit cannot be accessed from outside the housing. The only data-transmitting connection is generally physically interrupted by a so-called hardware lock. This is done, for example, by the data line being routed through a relay. The hardware lock can only be released and the data connection established by the user acting at close range of the pressure sensor assembly acts on a release mechanism in the interior of the housing of the pressure sensor assembly with a physical component acting at close range, in particular a contact-less component acting or being used from the outside.

For the purposes of the present invention, "at close range" can mean that release can only be achieved if the user is sufficiently close to the pressure sensor assembly to be satisfied that there is a safe operating or resting state on the machine in which the pressure sensor assembly is installed before releasing the hardware lock.

In addition to contactless component such as light or electric or magnetic fields, simple mechanical components such as a button accessible through an opening or a plug-in plug inserted into the housing to release the hardware lock may also be provided.

At least one parameterization module for setting the switching thresholds within the monitoring unit is preferably a digital potentiometer.

The control can be via a serial data bus line and in particular via Serial Peripheral Interface (SPI) from the microcontroller of the transmission unit. The parameterization module is accessed by the user from outside the housing via the IO-link interface.

The firmware of the microcontroller of the transmission unit as well as the software layers above it are not taken into account in the safety assessment and do not need to be taken into account according to the invention. Therefore, the adjustability of the potentiometer is prevented by hardware as soon as the switching point has been set.

Optics can be used for the release by inserting a light-dependent electrical component such as a photodiode, which must be actively illuminated by the user through a housing opening.

Furthermore, it is possible to use magnets to address a REED contact as a release element, or an NFC tag that acts on a suitable reader in the housing.

The pressure sensor element is preferably connected in parallel to the transmission unit and the monitoring unit, so that the measured value acquired by the same sensor element can be transmitted to a higher-level control or regulating device in the form of an IO-link, and at the same time the measured value can be evaluated with regard to the permissible interval in the monitoring unit.

The monitoring unit can include an input amplifier, a comparator with an adjustable switching threshold, and a mechanical relay or semiconductor relay for the potential-free connection of two terminals, thereby generating an output signal. While a switching contact is closed in a regulated and permissible operating state, the contact is opened in the event of an overload.

Preferably, the output signal of the comparator can be linked to the potential of the supply voltage in the sensor cable, so that any interference that may occur there will also cause the contact at the output terminals to be opened.

If the power supply to the pressure sensor assembly is completely interrupted, the contact is also opened due to the design of the output stage as an opener.

An example provides for two parameterization modules, so that an upper and a lower limit value can be set, both of which are monitored by the comparator. While the upper limit value is directly used for operational safety, the purpose of monitoring the lower limit value is to detect abnormal measured values which may be caused by disturbances in the pressure sensor assembly or the system.

This is the case, for example, if the measured pressure appears to have a negative value. If the lower limit value is set to zero, a negative reading is signaled as erroneous.

The inventive pressure sensor assembly is designed as a melt pressure sensor assembly for a plastics extrusion line. The difference here is that the pressure in the plastic melt has to be measured, wherein the pressure sensor at the measuring point has to withstand pressures of more than 100 bar and temperatures of more than 200° C. on a regular basis. For this application, a housing with a long, hollow shaft is provided, at the end of which a first diaphragm is disposed. The diaphragm is positioned at the measuring point. The actual pressure sensor element is located on another diaphragm in a housing section beyond the shaft, wherein the pressure transmission between the diaphragms takes place over a liquid-filled capillary.

The sequence of the adjustment of the switching point in the pressure sensor assembly according to the invention can be as follows:

The pressure sensor assembly is connected to an IO-link master via the terminals provided. Subsequently, the mechanical safety of the photo diode, which forms the release module in a modified example, is removed, and the photo diode is illuminated by an external light source such as a flashlight. Now the parameter for the desired limit value is written to the respective parameterization module via the IO-link interface and thus permanently set in the overload protection device. Once the setting has been completed, the external light source is removed and the mechanical safety is reattached to the housing opening. Finally, the correct setting of the switching threshold must be checked by the user by applying the respective signal to the pressure sensor assembly and approaching the switching point. If the correct setting of the switching point is ensured, the pressure sensor assembly can be put into operation. If the switching point was not set correctly, the procedure must be repeated.

A device is also provided by which the original state with the interrupted internal data bus line is restored either when a preset period of time expires or as soon as the user stops acting on the release element from close range. On the release element coupled to the bridge element, the internal data line is interrupted again, so that limit values can no longer be parameterized via the external data bus line.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
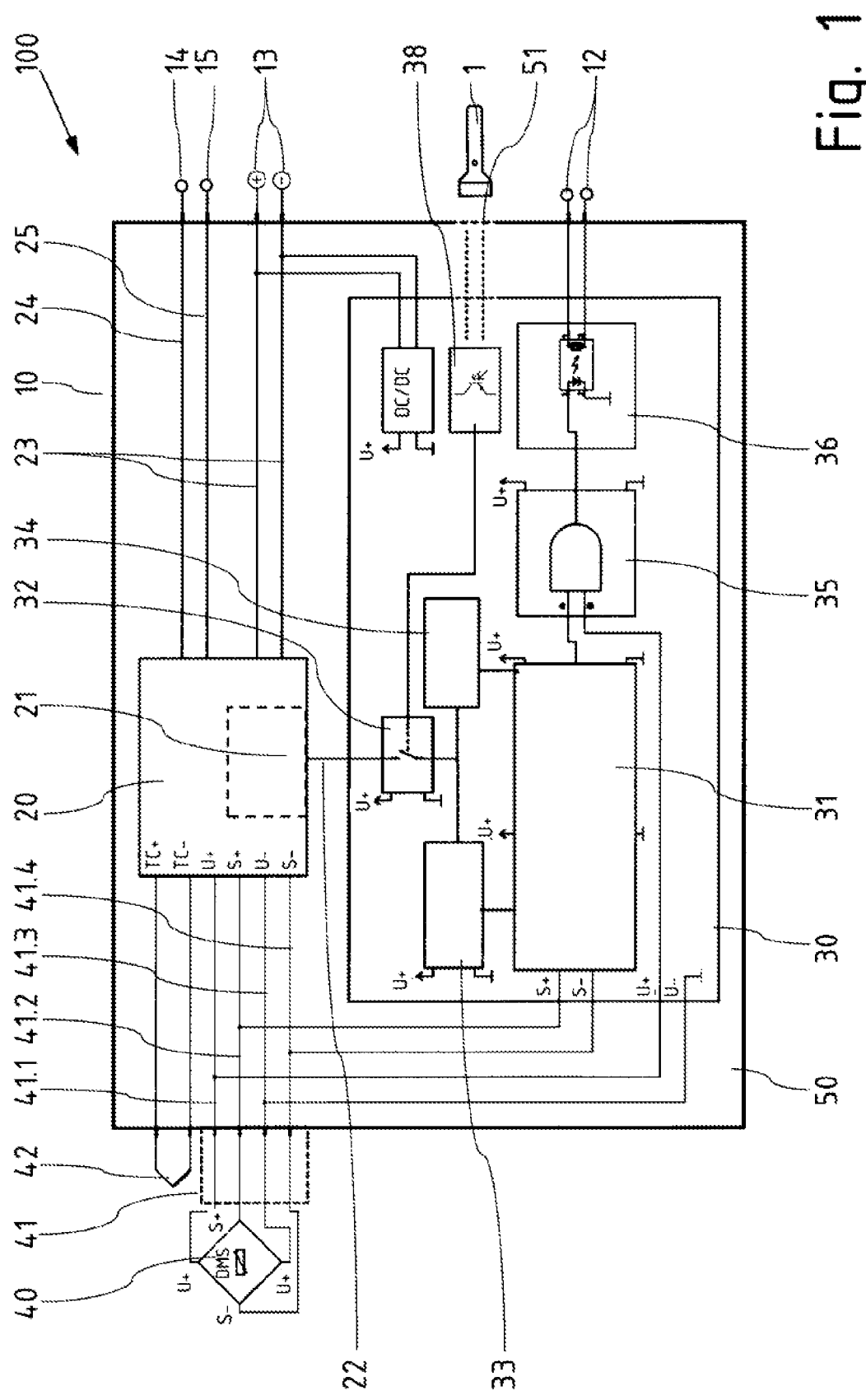
FIG. 1 shows a pressure sensor assembly in a block diagram.

FIG. 1 shows a block diagram of a pressure sensor assembly 100 according to the invention. It essentially comprises: a pressure sensor 40, which is constructed in a well-known form as a bridge sensor according to the principle of the WHEATSTONE bridge, a transmission unit 20 designed as an IO-link client and connected to the pressure sensor 40 via a sensor cable 41 with at least four poles; a monitoring unit 30; a closed and, if necessary, sealable housing 10, in which at least the transmission unit 20 and the monitoring unit 30 are mounted.

The transmission unit 20 and the monitoring unit 30 are housed on a common circuit board 50 but are positioned separately on it to prevent mutual interference. The two units 20 and 30 are connected only by: a common feed for the supply voltage, which is routed from terminals 13 on the housing 10 to the transmission unit 20 via a multi-wired cable 21 and which is continued in wires 41.1, 41.3 in the sensor cable 41; the voltage can be provided in particular via an IO-link master and is 24 V; a parallel connection to the bridge sensor via two wires 41.2, 41.4 in the sensor cable 41; a Serial Peripheral Interface (SPI) 21 for setting the switching threshold, which is connected to the monitoring unit 30 via the data bus line 22.

The following connections are provided on the housing 10: a two-pin connector 13 for the power supply; a connection of at least one pole 14 for a serial data bus, in particular according to the IO-link specification, which is routed via a data bus line 24 to the transmission unit 20; an analog output 15 connected to an analog line 25, for the optional output of an analog reading for the measured pressure, and two signal output terminals 12, via which, for example, a signal can be emitted to the outside or an external shut-down device can be actuated.

Preferably, the pressure sensor assembly 100 permanently closes a contact between the signal output terminals 12 as long as the values detected by the pressure sensor 40 are within the permissible value range defined within the monitoring unit 30. Conversely, this means that: a failure of the power supply, or a failure of components within the pressure sensor assembly 100 or falling below or exceeding the permissible pressure measured value by the measured actual value in each case causes the signaling of a safe operating state to be cancelled at the signal output terminals 12.

Additionally, a recess 11 is provided on the housing 10, which may be provided with a translucent cover. Behind it is a release module 38, which is designed in the form of a photodiode or a phototransistor, for example. By temporarily emitting a beam of light with a lamp 1 positioned outside the housing 10, a release signal is generated at the release module 38, which actuates a bridge switching element 32. This closes an internal data bus line 22 of the serial data bus, which had previously been permanently interrupted at the bridge switching element 32, and which extends from the transmission unit 20 to two parameterization modules 33, 34 in the monitoring unit 30.

The parameterization modules 33 and 34 are electrical devices for which a characteristic control value can be set via the data bus. These can be, for example, digital potentiometers.

The parameterization modules 33 and 34 contain the upper and lower threshold values for the electrical threshold device 31 implemented in the monitoring unit 30.

The sensor signals of the pressure sensor 40 are connected to the threshold device 31 via the signal-carrying wires 41.2, 41.4 of the sensor cable 41. As long as the comparator in the threshold device 31 detects that the measured value is within the permissible range, if necessary after making corrections, a positive voltage signal is emitted. This is connected at the pressure sensor 40 via a logical AND link 35 and the wire 41.1 with the positive terminal of the supply voltage. Only if the supply voltage is present and at the same time there is a positive potential at the output of the threshold device 31 will the output of the AND link also have a positive potential. Above this, a switching element such as, in particular, an optocoupler 36 is operated. As a result, the contact between the terminals 12 is closed and indicates a safe operating state of the machine to which the pressure sensor assembly 100 is attached.

If, on the other hand, there is either a voltage drop at the sensor cable 41 or if it is detected that the measured and, if necessary, corrected measured value falls below or exceeds one of the threshold values stored in the parameterization modules 33, 34, the potential drops at the output of the AND link 35.

To redefine the thresholds, the release module 38 must be activated with light. The data bus line 22 is then connected to the bridge switching element 32. By means of a data bus line introduced from the outside to the transmission unit 20 in the housing 10, each of the parameterization modules 33, 34 can now be addressed sequentially and a new value can be stored and defined in them.

After that, the light source at the housing opening 11 is removed. The data bus line 22 is interrupted again on the hardware side at the bridge element 32, so that it is no longer possible to address and change the parameterization modules 33, 34 from the outside.

An additional temperature sensor 42 may be provided, which is also connected to the transmission unit 20. Since temperature measurement is not safety-relevant for the application, no switching thresholds need to be parameterized.

Figure 2:
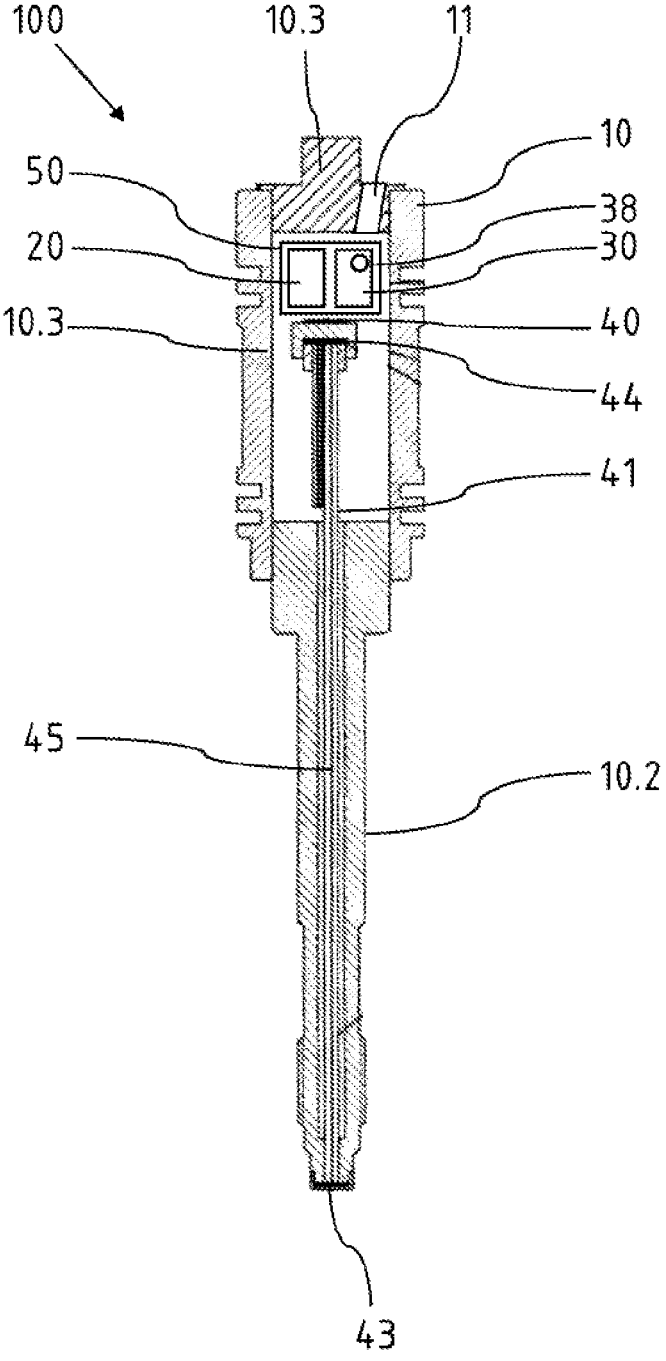
FIG. 2 shows the housing of the pressure sensor assembly in section.

FIG. 2 shows a section through the housing 10 of the pressure sensor assembly 100. The housing has a hollow cylindrical housing section 10.1 in which the two main electronic assemblies, namely the transmission unit 20 and the monitoring unit 30, are housed on the common board 50. At the tip of a hollow housing shaft 10.2 is a first diaphragm 43. A pressure applied there deflects the diaphragm 43. Via a column of liquid in a capillary line 45, a second diaphragm 44 is deflected, which is connected to a pressure sensor element 40, so that the conversion into an electrical measurement signal takes place there. Since the electrical transducer is also located inside the housing, the housing can be completely closed.

The terminals 12, 13, 14 and 15 are grouped together in a multi-pin plug or socket on an upper part of the housing 10.3, which closes the hollow cylindrical part of the housing 10.1. A lockable housing opening 11 is inserted in the cover-like housing section 10.3 in order to be able to be able to illuminate the optically effective release element 38, which is mounted on the inner part of the board 50. Once the pressure sensor assembly 100 has been parameterized, the housing opening 11 is closed with a screw, for example, and illumination of the release element 38 is prevented.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pressure sensor assembly comprising:
a remotely parameterizable electrical threshold device;
an electrical sensor element;
a transmission unit connected to at least the sensor element and to a data bus line leading to an external connection;
a monitoring unit, which contains the threshold device and is connected to the at least one sensor element and an actuator to generate an output signal; and
a closeable housing in which at least the transmission and the monitoring unit are arranged;
at least one internal data bus line, the transmission unit being connected to the monitoring unit via the at least one internal data bus line which is interrupted by an electrically switchable bridge switching element;
at least one parameterization module connected to the threshold device is provided in the monitoring unit to set a lower and/or an upper pressure limit, the parametrization module being connectable via the internal data bus line to the transmission unit by closing the bridge switching element; and
a release element, wherein the bridge switching element must be closed via the release element which is adapted to be operated from a close range of the housing.

2. The pressure sensor assembly according to claim 1, wherein the parameterization module is a digital potentiometer connected to the internal data bus line.

3. The pressure sensor assembly according to claim 1, wherein a parameterization module is provided for a lower and an upper limit value, and wherein both parameterization modules are connected to the threshold device.

4. The pressure sensor assembly according to claim 1, wherein the release element is an optical electrical element and wherein the housing has at least one closable housing opening via which the release element is illuminated.

5. The pressure sensor assembly according to claim 1, wherein the release element is a magnetic electrical element.

6. The pressure sensor assembly according to claim 1, wherein the sensor element is a pressure sensor element for a plastic extrusion line and the pressure is transmitted via a liquid column in a capillary line between a first diaphragm at the tip of a housing shaft and a second diaphragm connected to the pressure sensor element.

7. The pressure sensor assembly according to claim 1, wherein the closable housing is completely closed and/or sealed.

8. The pressure sensor assembly according to claim 1, wherein the monitoring unit opens a switch state in an event of an overload.

9. The pressure sensor assembly according to claim 1, wherein an output signal of the threshold device is linked via an AND link to a potential of a supply voltage in the sensor cable.

10. The pressure sensor assembly according to claim 9, wherein the output signal of the threshold device or the AND link is connected to an optocoupler or to a relay via which two signal output terminals are connectable to each other potential-free.

11. The pressure sensor assembly according to claim 1, wherein the monitoring unit comprises an overload protector.

12. The pressure sensor assembly according to claim 11, wherein via the overload protector, a switch state is opened in an event of an overload.

13. A method for setting a switching point in a pressure sensor assembly according to claim 1, the method comprising:

connecting the pressure sensor assembly to an external data bus line;

closing the internal data bus line via the bridge switching element by user action on the release element from a close range to the pressure sensor assembly and from outside the housing;

writing at least one parameter for a limit value to the parameterization module via the external data bus line; and disconnecting the internal data bus line by terminating the action on the release element.

* * * * *